United States Patent No.: US 8,116,178 B1
Mitchem et al.
Date of Patent: Feb. 14, 2012

(54) SERVO ACCELERATOR SYSTEM FOR OPTICAL DRIVES

(75) Inventors: Jeff Mitchem, Broomfield, CO (US); Chris Turner, Estes Park, CO (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/023,164

(22) Filed: Feb. 8, 2011

Related U.S. Application Data

(63) Continuation of application No. 11/985,487, filed on Nov. 15, 2007, now Pat. No. 7,885,151.

(60) Provisional application No. 60/867,306, filed on Nov. 27, 2006.

(51) Int. Cl.
G11B 7/00 (2006.01)

(52) U.S. Cl. ............... 369/44.34; 369/44.35; 369/44.32; 369/124.11

(58) Field of Classification Search ............... 369/44.29, 369/44.32, 44.34–44.36, 59.15, 59.21, 124.05, 369/124.1–124.12, 124.09; 360/77.02, 77.08
See application file for complete search history.

(56) References Cited

U.S. PATENT DOCUMENTS

| | | | |
|---|---|---|---|
| 4,752,831 A * | 6/1988 | Biber et al. | 348/349 |
| 5,220,546 A | 6/1993 | Fennema | |
| 5,251,194 A | 10/1993 | Yoshimoto et al. | |
| 5,706,264 A | 1/1998 | Ando | |
| 5,757,747 A | 5/1998 | Shimada | |
| 5,970,032 A | 10/1999 | Ikeda et al. | |
| 6,522,606 B1 | 2/2003 | Tanaka et al. | |
| 6,526,006 B1 | 2/2003 | Yoshimi et al. | |
| 6,697,310 B1 | 2/2004 | Kuriuzawa et al. | |
| 6,958,881 B1 * | 10/2005 | Codilian et al. | 360/77.08 |
| 7,218,582 B2 | 5/2007 | Takahashi et al. | |
| 2004/0013056 A1 | 1/2004 | Ando | |
| 2004/0252599 A1 | 12/2004 | Sasaki | |
| 2007/0076542 A1 | 4/2007 | Ashida et al. | |

* cited by examiner

Primary Examiner — Thang Tran

(57) ABSTRACT

A method of operating a channel module, including: receiving a plurality of sensor signals generated based on at least one detected characteristic of a laser beam of an optical drive; performing computations based on the plurality of sensor signals; generating a computation output signal based on the computations; generating a first control signal and a second control signal; generating a first input signal based on (i) the computation output signal, (ii) the first control signal, and (iii) a first set of filter values; generating a second input signal based on (i) the second control signal, (ii) a second set of filter values, and (iii) an accumulated output signal; generating the accumulated output signal based on a sum of products generated based on the first input signal and the second input signal; and adjusting the at least one detected characteristic of the laser beam based on the accumulated output signal.

20 Claims, 8 Drawing Sheets

SERVO ACCELERATOR SYSTEM FOR OPTICAL DRIVES

CROSS-REFERENCE TO RELATED APPLICATIONS

The present disclosure is a continuation of U.S. application Ser. No. 11/985,487, filed on Nov. 15, 2007, which claims the benefit of U.S. Provisional Application No. 60/867,306, filed on Nov. 27, 2006. The disclosures of the applications referenced above are incorporated herein by reference.

FIELD

The present disclosure relates to optical drives and optical recording devices, and more particularly to servo systems and control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Optical recording devices are used to store information, such as music, movies, pictures, data, etc., on recordable media. Examples of recordable media are compact discs (CDs), digital versatile/video discs (DVDs), high density/high definition DVDs and Blu-ray Discs (BDs). In order to record and read such information, operation of a read/write head is controlled to track the location and focus of a laser beam on the recordable media.

In an optical drive the laser beam is moved while an optical storage medium is rotated about a spindle axis. The laser beam is shaped and focused to form a spot over land/groove structures of the optical storage medium via lens actuators. The light from the laser beam is reflected off of the optical medium and directed back into a read/write head. The reflected light is redirected and focused into a spot over a photo-detector integrated circuit (PDIC).

To control the positioning, tracking, and focusing of the laser beam, various servo control computations are performed on information that is collected from the PDIC. The servo control computations provide different tracking and focusing characteristic information including tracking error and focusing error. The servo control computations also include the generation of compensation signals for correction of the errors.

The servo control computations are performed by and can consume up to approximately 90% of the operating time of a processor of the optical drive. This significantly limits the ability of the processor to perform other tasks and thus also limits the operating speed of the optical storage medium.

SUMMARY

In one aspect, this specification discloses, a method of operating a channel module, including: receiving a plurality of sensor signals generated based on at least one detected characteristic of a laser beam of an optical drive; performing computations based on the plurality of sensor signals; generating a computation output signal based on the computations; generating a first control signal and a second control signal; generating a first input signal based on (i) the computation output signal, (ii) the first control signal, and (iii) a first set of filter values; generating a second input signal based on (i) the second control signal, (ii) a second set of filter values, and (iii) an accumulated output signal; generating the accumulated output signal based on a sum of products generated based on the first input signal and the second input signal; and adjusting the at least one detected characteristic of the laser beam based on the accumulated output signal.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
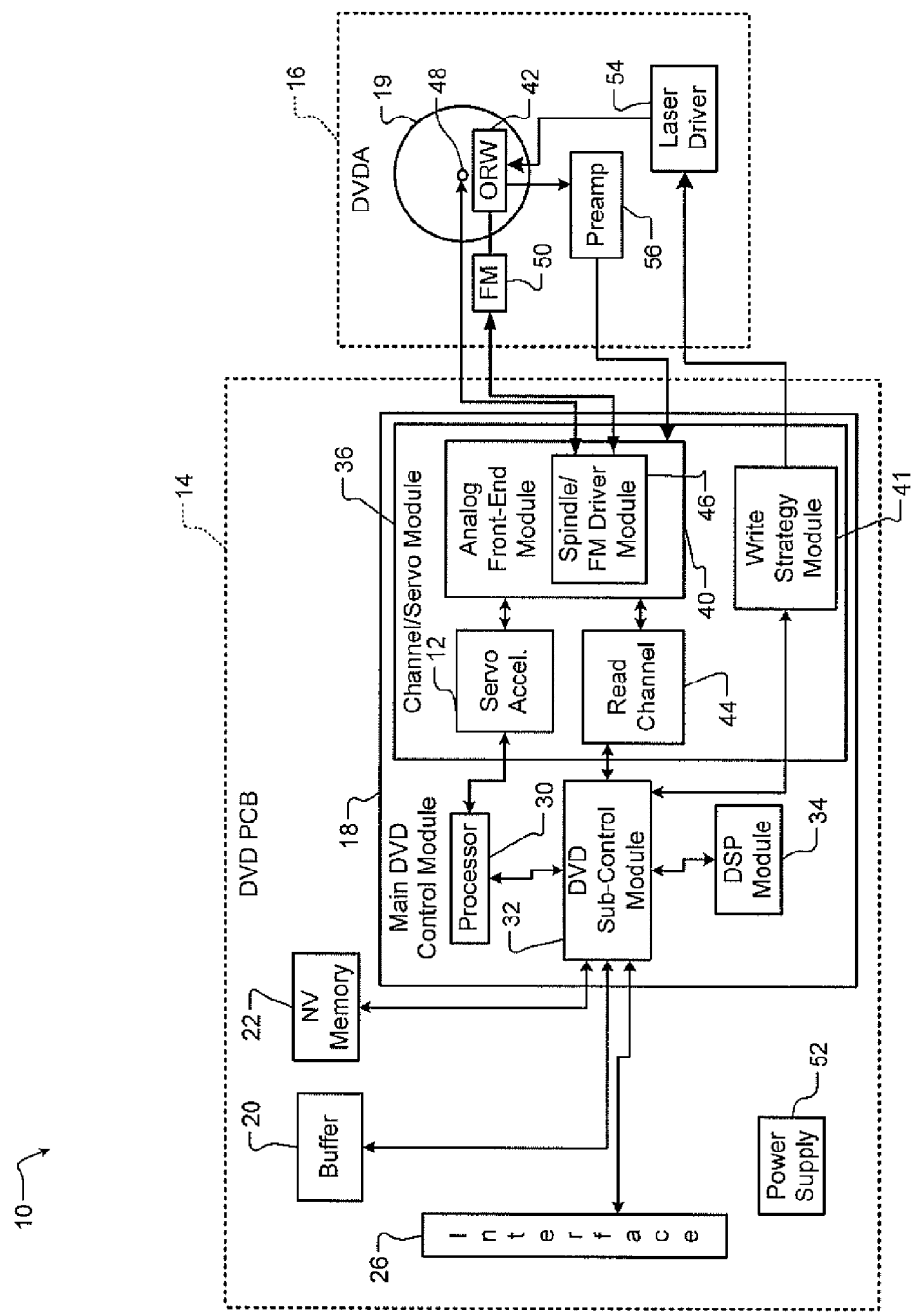
FIG. 1 is a functional block diagram of a DVD drive incorporating a servo accelerator in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or software programs, a combinational logic circuit, and/or other suitable components that provide the described functionality.

Referring to FIG. 1, a DVD drive 10 incorporating a servo accelerator 12 is shown. Although the following embodiments are described primarily with respect to a DVD drive they may be implemented on a CD drive. The DVD drive 10 includes a DVD printed circuit board (PCB) 14 and a DVD assembly (DVDA) 16 for performing read and write tasks relative to an optical storage medium 19. The DVD PCB 14 includes a main DVD control module 18, a buffer 20, nonvolatile memory 22, and an input/output (I/O) interface 26. The main DVD control module 18 controls operation of the DVDA 16 and includes the servo accelerator 12 and a processor 30. The servo accelerator 12 performs various servo control computations. The servo control computations are performed for the processor 30 and may be performed while the processor 30 performs tasks, such as encoding, decoding, filtering, and formatting, as well as information transfer, computation execution, interrupt signal generation, and other tasks.

The main DVD control module 18 includes the processor 30, a DVD sub-control module 32, a digital signal processor (DSP) module 34 and a channel/servo module 36. Although the processor 30, the DVD sub-control module 32, and the DSP module 34 are shown as separate entities, they may be combined into a signal processor and/or module. The DVD sub-control module 32 is coupled between the processor 30 and the DSP module 34 and controls operation of the channel/servo module 36. The DVD sub-control module 32 may communicate with an external device via the I/O interface 26. The external device may include a computer, a multimedia device, a mobile computing device, etc. The I/O interface 26 may include wireline and/or wireless communication links. The DVD sub-control module 32 may receive data from the buffer 20, the nonvolatile memory 22, the I/O interface 26, the processor 30, the DSP module 34 and/or the channel/servo module 36.

The channel/servo module 36 includes an analog front-end module 40 that is in communication with the DVDA 16 and a write strategy module 41. The analog front-end module 40 controls operation of and receives read data from an optical read/write head 42 of the DVDA 16. The read data is provided to a read channel 44, which forwards the read data to the DVD sub-control module 32. The analog front-end module 40 includes a spindle/FM driver module 46. The spindle/FM driver module 46 controls operation of a spindle motor 48 and a feed motor 50 of the DVDA 16.

The processor 30 may process the data, including encoding, decoding, filtering, and/or formatting. The DSP module 34 performs signal processing, such as video and/or audio coding/decoding. The processed data may be output to the buffer 20, nonvolatile memory 22, the I/O interface 26, the processor 30, the DSP module 34, the analog front-end module 40, the write strategy module 41, and/or the spindle/FM driver module 46. The processor 30 may be a microprocessor and have associated input and outputs.

The main DVD control module 18 may use the buffer 20 and/or nonvolatile memory 22 to store data related to the control and operation of the DVD drive 10. The buffer 20 may include dynamic random access memory (DRAM), synchronous DRAM (SDRAM), etc. The nonvolatile memory 22 may include flash memory (including NAND and NOR flash memory), phase change memory, magnetic random access memory (RAM), or multi-state memory, in which each memory cell has more than two states. The DVD PCB 14 also includes a power supply 52 that provides power to the components of the DVD drive 10.

The DVDA may include a preamplifier device, a laser driver, and an optical device, which may be an optical read/write (ORW) device or an optical read-only (ORO) device. A spindle motor rotates an optical storage medium, and a feed motor actuates the optical device relative to the optical storage medium.

When reading data from the optical storage medium 19, a laser driver 54 that is in communication with the write strategy module 41 provides a read power to the optical read/write head 42. The optical read/write head 42 detects data from the optical storage medium 19, and transmits the data to a preamplifier device 56. The analog front-end module 40 receives data from the preamplifier device 56 and performs such functions as filtering and A/D conversion. To write to the optical storage medium 19, the write strategy module 41 transmits power level and timing data to the laser driver 54. The laser driver 54 controls the optical read/write head 42 to write data to the optical storage medium 19.

Figure 2:
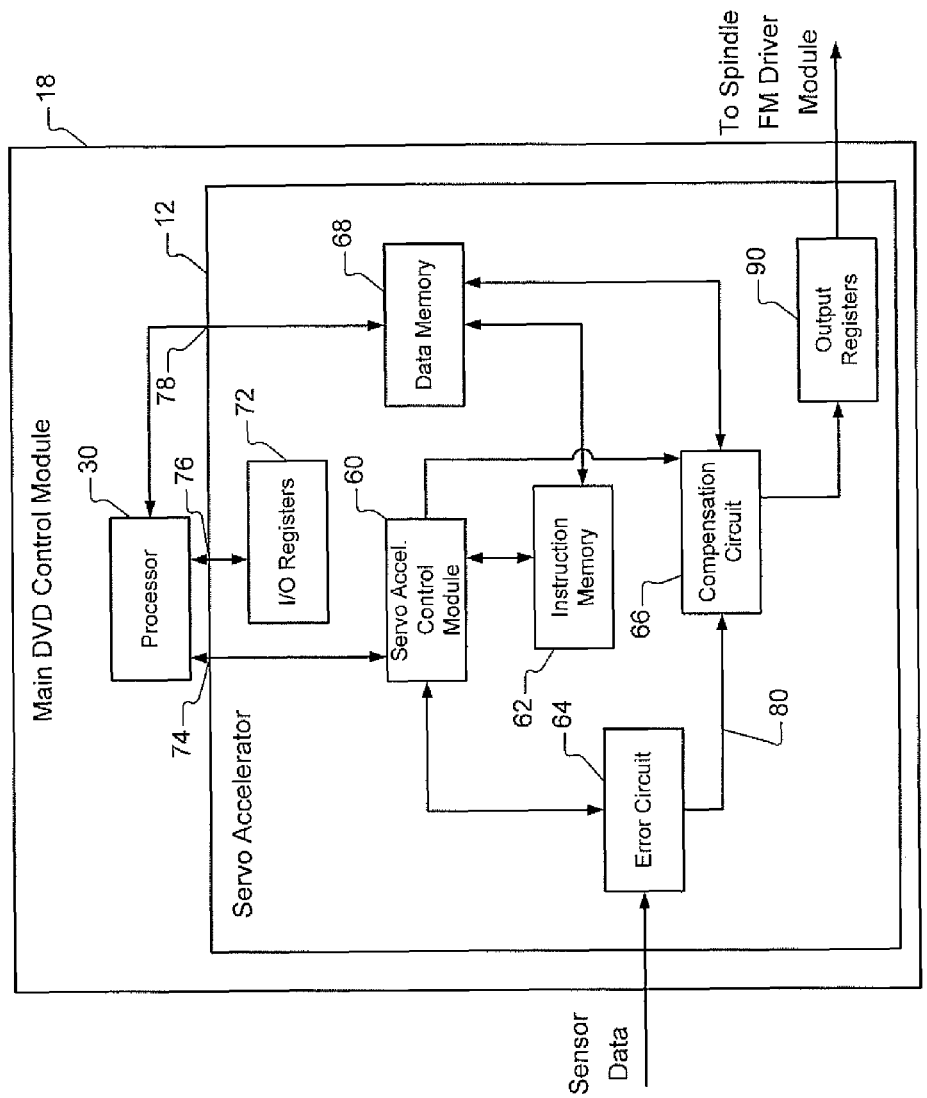
FIG. 2 is a functional block diagram of a main DVD control module in accordance with an embodiment of the present disclosure.
Figure 4:
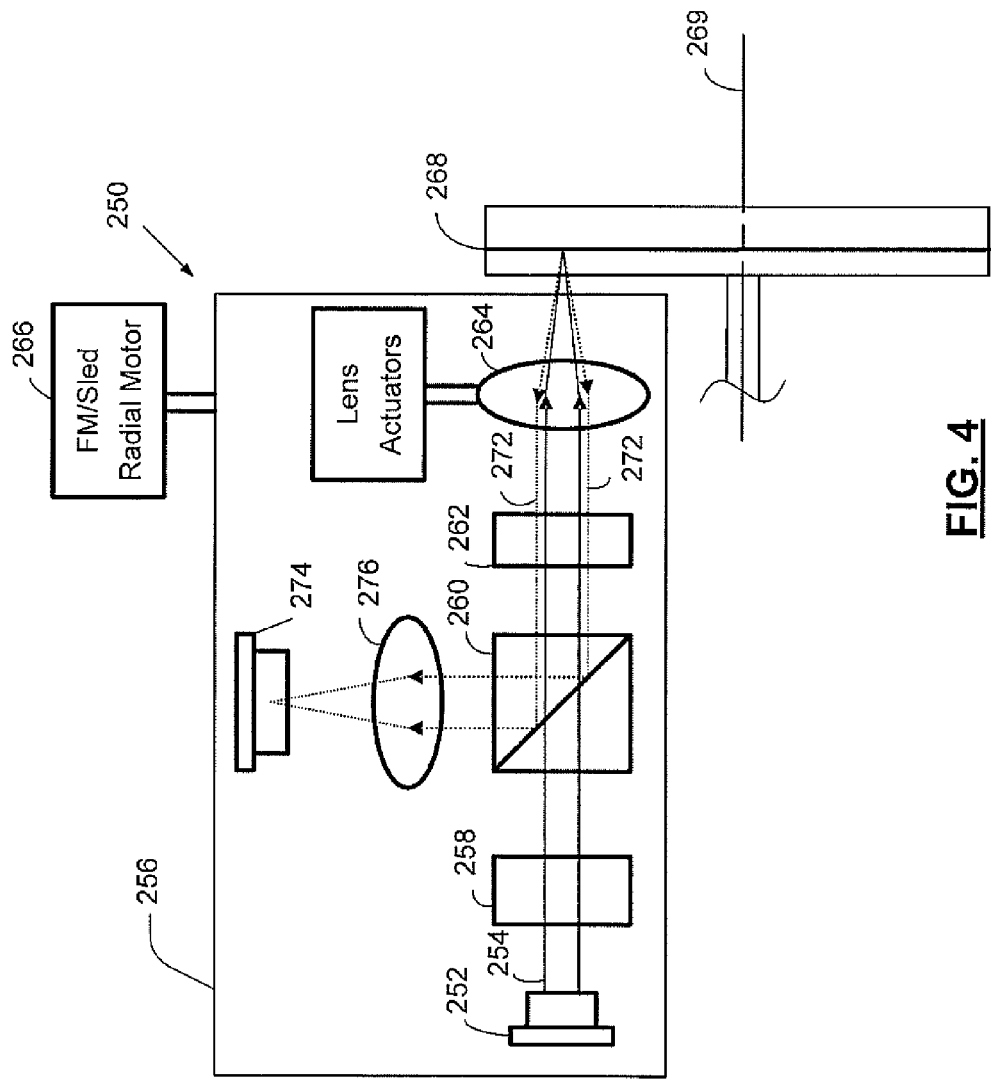
FIG. 4 is a sample optical DVD drive system in accordance with another embodiment of the present disclosure.

Referring to FIG. 2, a functional block diagram of the main DVD control module 18 is shown. The main DVD control module 18 may be a system-on-chip (SOC) and includes the servo accelerator 12 and the processor 30. The servo accelerator 12 includes a servo accelerator control module 60, an instruction memory 62, a sensor computation error circuit 64, a compensation circuit 66 and a data memory 68. The servo accelerator control module 60 receives information and instructions from the processor 30 via I/O registers 72 and I/O terminals 72 and stores the instructions in the instruction memory. The I/O terminals include one or more servo accelerator control module I/O terminals 74, I/O register terminals 76 and data memory terminals 78. The error circuit 64 receives sensor data from a sensor complex on a DVDA, such as the DVDA 16 and generates computation and/or error signals 80. A sample sensor complex is shown in FIG. 4. The compensation circuit 66 adjusts a characteristic of a laser beam based on the computation and/or error signals 80. A laser beam characteristic may include focus, position, amplitude, angle of incidence, or other beam characteristic. The servo accelerator control module 60 controls operation of the error circuit 64 and the compensation circuit 66 based on the received information and instructions.

The servo accelerator 12 may be programmable. Instructions may, for example, be written in assembly code and binary data may be generated using a script. The binary data may be loaded into the instruction memory 62 and then executed via the servo accelerator control module 60.

The servo accelerator control module 60, the instruction memory 62, the error circuit 64, the compensation circuit 66 and the data memory 68 are used to determine tracking and focus errors and perform as a filter to minimize such errors. The servo accelerator control module 60 may communicate with the error circuit 64, the compensation circuit 66 and the data memory 68 directly or via the instruction memory 62. The servo accelerator control module 60 may include logic devices and may perform as a state machine. In one embodiment, the servo accelerator control module 60 includes logic devices and does not include a processor and/or a device that executes a program. In another embodiment, the servo accelerator control module 60 includes discrete logic devices or devices with a minimal number of gates. The servo accelerator control module 60 interacts with software on the processor 30 to perform servo control computations.

The instruction memory 62 may include random access memory (RAM) or other memory. In one embodiment, the instruction memory 62 is a 256 word×25 bit memory, however it may be of various sizes. The instruction memory 62 stores control signals, such as error circuit and compensation circuit control signals, as well as address selection signals 69 for addressing the data memory 68, and other information. The instruction memory 62 may be used to address the data memory 68, such as during download of filter values from the processor 30, and/or in obtaining filter values from the data memory 68 for the compensation circuit 66.

The error circuit 64 processes and/or performs computations based on the data received from the sensor complex. The computations may include quadsum (QS), sidebeam SUM (SB), mainbeam push-pull (MBPP), sidebeam push-pull (SBPP), focus error (FE), track error (TE), FocNorm, and TrackNorm, which are defined by equations 1-9, as well as other computations. Some computations, such as the computations for FE and TE, may be performed by the error circuit 64, the compensation circuit 66, a module external to the servo accelerator 12, or a combination thereof. Variables A-H represent sensor output signals, such as photodiode output signals. Variables K, $K_1$ and $K_2$ are constants.

$$QS = A+B+C+D \quad (1)$$

$$SB = E+F+G+H \quad (2)$$

$$MBPP = A+D-B-C \quad (3)$$

$$SBPP = E+F-G-H \quad (4)$$

$$FE = \frac{(A-D)}{K_1(A+D)} + \frac{(C-B)}{K_2(B+C)} \quad (5)$$

$$FocNorm_1 = \frac{1}{K_1(A+D)} \quad (6)$$

$$FocNorm_2 = \frac{1}{K_2(B+C)} \quad (7)$$

$$TE = \frac{[MBPP+(K \cdot SBPP]}{(QS+K \cdot SBPP)} \quad (8)$$

$$TrackNorm = (QS + K \cdot SB) \quad (9)$$

The compensation circuit 66 may perform various computations, such as tracking and focus error computations, filter computations, and other computations. In one embodiment, the compensation circuit 66 performs as a filter, such as an infinite impulse response (IIR) filter. The compensation circuit 66 may perform as a transfer function $F_T(z)$ provided by equation 10 and generate a compensation signal output $y_k$, as provided by equation 11. Variables $a_i$ and $b_j$ are coefficient values of the transfer function $F_T(z)$. Variable $x_k$ may represent a tracking or focus error value, where k represents a clock cycle. The tracking and focus error values $x_k, x_{k-1}, x_{k-2} \ldots$ may be received from the error circuit 64.

$$F_T(Z) = \frac{(a_0 + a_1 z^{-1} + a_2 z^{-2} + \ldots)}{(1 + b_1 z^{-1} + b_2 z^{-2} + \ldots)} \quad (10)$$

$$y_k = a_0 x_k + a_1 x_{k-1} + a_2 x_{k-2} + \ldots - b_1 y_{k-1} - b_2 y_{k-2} - \quad (11)$$

The data memory 68 stores filter values and data received from the processor 30 and the compensation circuit 66. The filter values may include coefficient values, error values, compensation signal values and other values. The data memory 68 may include RAM or some other memory. In one embodiment the data memory 68 includes unstacked and stacked portions, which store the coefficient values $a_i$ and $b_j$, the error values $x_k, x_{k-1}, x_{k-2} \ldots$, and the compensation signal values $y_k, y_{k-1}, y_{k-2} \ldots$, where i and j are integer values. In one embodiment, the data memory 68 is a 256 word×22 bit memory, however it may be of various sizes.

The servo accelerator 12 further includes output registers 90, which receive the compensation signal value $y_k$. During a beam update, the compensation signal value $y_k$ is provided to one or more digital-to-analog converters (DACs), which drive optical read/write head motors and/or actuators for beam positioning and focusing.

Figure 3:
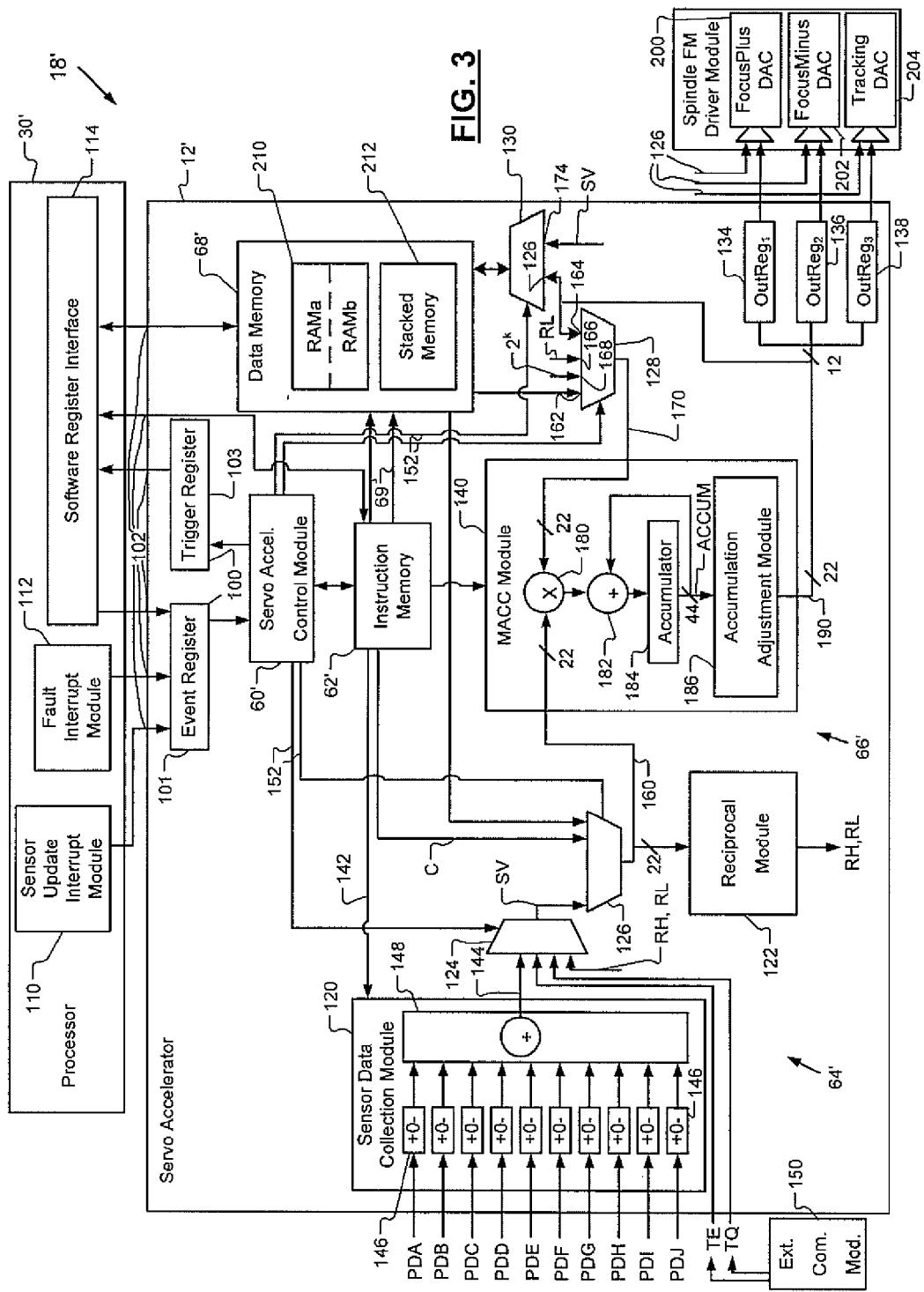
FIG. 3 is a functional block diagram of a main DVD control module in accordance with another embodiment of the present disclosure.

Referring to FIG. 3, a functional block diagram of a main DVD control module 18' is shown. The main DVD control module 18' may be a system-on-chip (SOC) and includes a processor 30' and a servo accelerator 12'. The servo accelerator 12' includes I/O registers 100, a sensor computation error circuit 64' that has a servo accelerator control module 60', an instruction memory 62', a compensation circuit 66', and a data memory 68'. The I/O registers 100 may include an event register 101, a trigger register 103, and other registers. The servo accelerator control module 60' communicates with the processor 30 via I/O terminals 102. The I/O terminals 102 may include interrupt terminals, software register interface terminals, event register terminals, trigger register terminals, data memory terminals and other terminals. The servo accelerator 12' receives information and instructions from the processor 30', performs computations and provides compensation updates to minimize tracking and focus errors.

The processor 30', as shown, includes a sensor update interrupt module 110, a fault interrupt module 112, and a software register interface 114. The processor 30' signals the servo accelerator 12' when new sensor data is available via the sensor update interrupt module 110. The servo accelerator 12' generates an updated compensation signal based on a sensor update interrupt received from the sensor update interrupt module 110. The fault interrupt module 112 may generate a fault interrupt when an error or defect is detected, such as from a read channel. The software register interface 114 provides event signals, instructions, computation values and filter values to the servo accelerator 12'. The event signals and instructions are provided to the event register 101. In an example embodiment, computation constant values are provided to the event register 101 and filter coefficient values are provided to the data memory 68'. The servo accelerator 12' may operate with minimal assistance from the processor 30'. The processor 30' may be used for assistance in defect handling, managing of compensator coefficients, or other tasks.

The I/O registers 100 may vary in size. In one embodiment, the event and trigger registers 101, 103 are each 16 bits in length. The event register 101 receives the event signals. Event bits of the event signals include one or more sensor interrupt bits and fault bits, as well as instruction bits. The event bits may be controlled by the processor 30'. Trigger bits of the trigger register 103 are set, cleared, and inverted by the servo accelerator 12'. The servo accelerator 12' may execute tasks based on the state of the event and trigger bits.

When an event signal is received, the servo accelerator control module 60' may set a trigger bit in the trigger register 103. Information in the trigger register 103 is provided to the software register interface 114. Upon receiving the trigger bit, a "handshaking" may occur between the processor 30' and the servo accelerator 12'. During the handshaking, the servo accelerator 12' may receive instructions via the event register 101 and the processor 30' may receive servo accelerator status signals via the trigger register 103. The status signals may include status of any of the elements or components of the servo accelerator 12', as well as sensor updates, filter signal updates, etc. The servo accelerator 12' may also receive and store filter values during a handshaking routine via the data memory 68'. A handshaking routine may occur to control access to sets of normalization values, which are to be read from the data memory 68'.

Event bits in the event register 101 are indicative of when an event has occurred and/or when an event has been completed. Some event bits may be referred to as "sticky" bits. When set, a sticky bit remains set until cleared by a trigger bit. The trigger bits may be used as status flags by the servo accelerator 12'. The trigger bits may be read by the processor 30' when the processor is ready, as opposed to interrupting the processor 30' during an event or task. The processor 30' may, for instance, complete a current process and then receive a sensor update or perform some other task based on a sticky bit. The processor 30' may control which bits are sticky. As an example, a sensor interrupt bit may be a sticky bit. When an interrupt pulse is detected by the servo accelerator 12', the sensor interrupt bit is set and held until a corresponding trigger bit is written with a 1 by servo accelerator software.

The sensor computation error circuit 64' and the compensation circuit 66' share devices of the servo accelerator 12'. The sensor computation error circuit 64' may include the servo accelerator control module 60', a sensor data collection module 120, a reciprocal module 122, first, second, third, and forth multiplexers 124, 126, 128, 130, a multiply accumulate module 132, the data memory 68', and the instruction memory 62'. The compensation circuit 66' may include the servo accelerator control module 60', the multiplexers 124, 126, 128, 130 the multiply accumulate module 132, output registers 134, 136, 138, the data memory 68', and the instruction memory 62'. The compensation circuit 66' may include any number of compensators. In the embodiment shown, a compensator is provided and is shown as a multiply accumulate (MACC) module 140, which may be used for tracking and focus computations. In another embodiment, the compensation circuit 66' includes separate compensators for tracking and focus loops. As yet another example, the compensation circuit may include two 8th-order compensators; one for tracking and one for focusing. The order of the compensators depends on the capacity of the devices of the servo accelerator 12'.

The sensor data collection module 120 receives from a sensor complex on a DVDA, such as the DVDA 16, and generates computation and/or error signals. As shown, the collection module 120 may receive data from photodiode sensors having photodiode sensor output signals PDA-PDJ. The collection module 120 performs a computation with the received sensor signals based on a sensor selection and control signal 142 to generate a summation output signal 144. The collection module 120 includes multiplication blocks 146 and a summation block 148. Each of the multiplication blocks 146 receives a respective sensor signal and may, for example, multiply the sensor signal by +1, 0, or −1. Outputs of the multiplication blocks 146 are provided to the summation block 148. The summation block 148 may perform computations, such as that provided above in equations 1-4, or other selected computations. For example, the summation block 148 may perform computations to provide values associated with the denominators of the above equations 5-8.

The reciprocal module 122 performs computations to generate estimate reciprocals of received values. Depending upon the types of memory, modules and logic devices incorporated into the servo accelerator 12', fractional and/or decimal arithmetic may not be performed. In other words, fixed point arithmetic may be used, such that differentiation between resultant values is not possible. Different values, divided into the value 1, have a common resultant value of 0, in fixed point arithmetic. Thus, to estimate a reciprocal value, the reciprocal module 122 is divided into a large number L, such as $2^{28}$, and then a shift operation is performed.

As an example, the reciprocal module 122 may estimate the values FocNorm$_1$ and FocNorm$_2$, as shown in equations 6 and 7. The specific values provided below are for example purposes only; the values may vary depending upon the reciprocal estimated, memory sizes, etc. For the value FocNorm$_1$, the reciprocal module 122 may receive the values K$_1$ and (A+D) individually or as the product K$_1$(A+D). The reciprocal module 122 may receive the product K$_1$(A+D) and then divide the product into the selected large number L, as represented by equation 12. Variable s represents the value that is normalized to estimate a reciprocal or quotient value q. In this example, s equals the product K$_1$(A+D). Similar computations may be performed for the value FocNorm$_2$.

$$q = \frac{L}{s}. \tag{12}$$

To minimize silicon area and latency, a 24-by-16 divider may be implemented, as provided by equations 13-15. When the absolute value of s is greater than or equal to $2^{15}$ or s≧$2^{15}$, equation 14 is used and the four least significant bits of the denominator s are discarded via a shift operation. The shift operation includes division of s by 16. When the absolute value of s is less than $2^{15}$ or s<$2^{15}$ the four least significant bits of the resultant quotient q are 0, and thus equation 15 is used.

$$q = \frac{2^{24}}{s[15:0]} \tag{13}$$

$$q = \frac{2^{24}}{\left(\frac{s}{16}\right)} \tag{14}$$

$$q = \left(\frac{2^{24}}{s}\right) \cdot 16 \tag{15}$$

The quotient q may be returned and represented as two 20-bit values reciprocal high (RH) and reciprocal low (RL). The relationship between the quotient q and the values RH, RL is provided by equation 16.

$$q = RH \cdot 2^{16} + RL \tag{16}$$

The reciprocal module 122 may perform estimate computations independent of and while other servo accelerator devices perform other computations and tasks. For example, the reciprocal module 122 may estimate a reciprocal while the multiply accumulate module 140 performs multiply and/or summation computations. The reciprocal module 122 may estimate a reciprocal over a predetermined number of clock cycles and hold and/or store the estimate until acquired by the compensation circuit 66'. The reciprocal module 122 may, for example, determine a reciprocal over a 12 clock cycle period.

The output values RH, RL of the reciprocal module 122, in the embodiment shown, are provided to the first and/or forth multiplexers 124, 130. In one embodiment, the quotient q is determined by the multiply accumulate module 140 instead of the reciprocal module 122 based on the values RH, RL.

The error circuit 120 may receive servo control computation values from modules external to the servo accelerator 12'. For example, the error circuit 120 may receive a tracking quadsum (TQ) value and a tracking error (TE) value from an external computation module 150. The external computation module 150 may be part of a main DVD control module and be on the same SOC as the processor 30' and the servo accelerator 12'. The external computation module 150 may be included as part of the processor 30' and perform other computations other than that specified. The servo control computation values are provided as inputs to the first multiplexer 124 for selective input to the reciprocal module 122 and/or the multiply accumulate module 140.

The multiplexers 124, 126, 128, 130 are controlled by the servo accelerator control module 60', as shown by respective control signals 152. The first multiplexer 124 has a first set of multiplexer inputs and provides a state value SV selected from the summation output signal 144, the values RH, RL, and any externally received servo control computation values, such as TE and TQ. The state value SV is provided to the second multiplexer 126, along with a constant value C, and data from the data memory 68'. The constant value C may be a constant associate with an equation of a computation or other constant value. The data from the data memory 68' may include filter values, such as coefficient values, error values, and/or compensation signal values. The second multiplexer 126 has a second set of multiplexer inputs and provides a first accumulator input signal 160 to the multiply accumulate block 140. The first accumulator input signal 160 may be an error signal that is based on selection of the second set of multiplexer inputs.

The third multiplexer 128 has a third set of multiplexer inputs, which may include one or more filter value inputs 162, a compensation signal value input 164, an RL input 166, and a large value input 168. The filter value inputs 162 may receive a stack signal (STK), a memory signal (RAMb), or other signal. The compensation signal input 164 and the RL input 166 receive corresponding compensation and RL signals. The large value input 168 receives a large value, such as the large value L or $2^k$. The third multiplexer 128 provides a second accumulator input signal 170 to the multiply accumulate module 140. The forth multiplexer 130 has a forth set of multiplexer inputs, which may include a compensation signal value input 172 and the state value SV input 174.

The multiply accumulate module 140 includes a multiplier 180, a summer 182, an accumulator 184, and an accumulation adjustment module 186. The first and second accumulate input signals 160, 170 may be multiplied by the multiplier 180 and summed with an accumulated value 188 via the summer 182. The multiplier 180 may multiply the first and second accumulate input signals 160, 170 by a value of −1. The multiplier 180 may also be bypassed and/or used to select only one of the first and second accumulate input signals 160, 170. For example, a constant value may be provided as the first accumulate input signal 160 and forwarded to the summer 182.

The accumulator 184 may store a sum-of-products (SOPs), such as the result of $a_0x_k+a_1x_{k-1}+a_2x_{k-2}+\ldots$. The SOPs may be provided in the form of an accumulation signal ACCUM to the accumulation adjustment module 186. The accumulate adjustment module 186 generates an accumulate output signal 190. The accumulate output signal 190 may be in the form of an error signal or a compensation signal. An error signal may be an error value or a product of a coefficient and an error value, such as $x_k$ or $a_1x_k$. A compensation signal may be a compensation value or a product of a coefficient and a previous compensation value, such as $y_k$ or $b_1y_{k-1}$.

The accumulation adjustment module 186 performs a saturate, round, shift or other adjustment to the accumulation signal ACCUM. The adjustments may include the selection of the most or the least significant bits of the accumulation signal ACCUM. The adjustment defines the accuracy and range of the compensation signal generated. For example, in one embodiment, the first and second accumulate input signals 160, 170 are received each having 22 bits. The accumulation signal ACCUM has 44 bits to account for the multiplication performed by the multiplier 180.

Since the accumulation signal ACCUM has more bits than the first and second accumulation input signals 160, 170, the accumulation signal ACCUM is saturated or truncated to generate the output of the multiply accumulate module 140. When saturated, a certain number of most significant bits are selected. For the example described, 22 of the most significant bits out of the 44 possible bits are selected. The accumulation signal ACCUM is reduced by the accumulation adjustment module 186 to 22 bits such that it may be received in a subsequent step as an accumulate input signal. A 44-22 bit reduction may be performed when providing the accumulate output signal 190 to the third multiplexer 128. For example, the accumulate output signal 190 may be provided as the second accumulate input signal 170 via the third multiplexer 128 and/or to the output registers 134-138. The output registers 134-138 may receive a yet lower associated number of bits and the accumulation output signal 190 may be saturated or truncated. A 44-12 bit reduction may be performed when providing the accumulate output signal 190 to the output registers 134-138.

The output registers 134-138 are coupled to focus and tracking DACs of a spindle FM driver module 46'. The focus and tracking DACs include a plus focus DAC 200, a minus focus DAC 202 and a tracking DAC 204. The DACs 200-204 may receive focus and tracking DAC override signals 208 from the processor 30' and/or a main DVD control module.

The data memory 68', as shown, includes unstacked memory 210 and stacked memory 212. The unstacked memory 210 includes coefficient values. The unstacked memory 210 may be divided into designated coefficient value sections, such as RAMa and RAMb, for the coefficient values $a_0, a_1, a_2 \ldots$ and $b_1, b_2, b_3 \ldots$. The unstacked memory 210 may be divided into any number of coefficient sections. The unstacked memory 210 may store multiple sets of coefficient values.

The stacked memory 212 may include any number of stacks. First and second stacks may for example be used when first and second portions of the compensation value $y_k$ are computed. The first portion may be $a_0x_k+a_1x_{k-1}+a_2x_{k-2}+\ldots$ and the second portion may be $-b_1y_{k-1}-b_2y_{k-2}-\ldots$. In one embodiment, the processor 30' writes the coefficient values $a_1, a_1, a_2 \ldots$ and $b_1, b_2, b_3 \ldots$ into sequential address locations of the data memory 68'. As an example, $a_0$ may be stored at location 0x40, $a_1$ at 0x41, $a_2$ at 0x42, . . . . The servo accelerator 12' may determine the error values $x_k, x_{k-1}, x_{k-2}, \ldots$ and pushes them onto the first stack. An instruction received and stored in the instruction memory may be to perform a SOP of memory locations 0x40:0x43 on the first stack. The multiply accumulate module 140 may then receive the coefficient values $a_0, a_1, a_2 \ldots$ one at a time, as the first accumulate input signal 160, and the error values $x_k, x_{k-1}, x_{k-2}, \ldots$ also one at a time, as the second accumulate input signal 170. The generated accumulation signal ACCUM may then equal $a_0x_k+a_1x_{k-1}+a_2x_{k-2}+\ldots$.

When multiple sets of coefficient values are supported, virtual addressing may be performed. This may occur when the processor 30' elects generation of a compensation signal based on a different set of coefficient values. Multiple sets of coefficient values may be loaded into designated banks of the data memory 68'. Instructions in the instruction memory 62' point to the set of coefficient values to be used in a computation. The multiply accumulate module 140 may perform computations without knowledge of which set of coefficient values are addressed. The actual data memory address that is accessed as a result of an SOP instruction is dependent on a bank control bit. The bank control bit refers to the last bit in a data memory address location associated with a coefficient value. When an address location has eight (8) bits, the eighth bit is the bank bit. When the bank bit is set to 1, then virtual addressing is used.

The instruction memory 62' maintains pointers for addressing the data memory 68' and/or for determining current stack locations. The number of stacks and the depth of each stack may be programmed. Stacks may be used for purposes other than accumulation and/or filtering purposes. The depths of the stacks may be set via the software register interface 114. Unused stack space may be freely used for other variables or data. Words are pushed on to each stack via push instructions. A stack may be accessed by multiply (MUL), multiply accumulate (MULA), SOP, SOP accumulate (SOPA) and other instructions.

In one embodiment, 8 stacks are programmed. Each stack has eight words. Stack 0 uses addresses 00h-07h, stack 1 uses addresses 08h-0fh, . . . , stack 7 uses addresses 38h-3fh. An offset value of zero refers to a word most recently pushed onto a stack ($x_k$). An offset value of 1 refers to the next most recently pushed word ($x_{k-1}$), etc.

Various instructions may be loaded into the instruction memory 62'. Some of the instructions have been described above. Additional instructions are described below. The described instructions are provided as examples, they may be modified depending upon the application. The servo accelerator 12' may operate based on the described instructions or based on other instructions.

An accumulator add (ADD) instruction may be loaded to add a value to an accumulated value stored in the accumulator 184. The value may be the sum of the sensor input signals PDA-PDJ, such as the summation output signal 144 or output of the reciprocal module 122, such as values RH and RL.

An accumulator load (ALD) instruction may be loaded to load a value into the accumulator 184. The value may be the summation output signal 144, a word in the data memory 68', or a constant.

A division (DIV) instruction may be loaded to enable the reciprocal module 122. The reciprocal module 122 may estimate a reciprocal of the summation output signal 144, a word in the data memory 68', a constant, or some other value.

A jump instruction follow (JIF) address instruction may be loaded to jump to an address in the data memory 68' when an event bit is set or when a divide-by-zero operation has occurred. A jump instruction follow trigger (JIFT) address instruction may be loaded to jump to an address in the data memory 68' when a trigger bit is set. A jump less than (JLT) address instruction may be loaded to jump to an address when the value in the accumulator 184 is less than a 12 bit signed value. A jump (JMP) address instruction may be loaded to jump to a particular instruction.

The multiplication (MUL) instruction may be loaded to perform a multiplication computation. A left MUL signal may include multiplication of the summation output signal 144, the values RH, RL, the tracking error signal TE, the tracking quadsum signal TQ, a word in the data memory 68' or other input signal. A right MUL signal may include multiplication of the accumulated value in the accumulator 184, a reciprocal scale value, such as the value RL, a word in the data memory 68' or other input signal.

The multiply accumulate (MULA) instruction may be loaded to perform a multiplication and add computation the result thereof to the accumulated value stored in the accumulator 184. A left MULA signal may include multiplication of the summation output signal 144, the values RH, RL, the tracking error signal TE, the tracking quadsum signal TQ, a word in the data memory 68' or other input signal followed by addition to the accumulated value. A right MULA signal may include multiplication of the accumulated signal in the accumulator 184, a reciprocal scale value, such as the reciprocal low value RL, a word in the data memory 68' or other input followed by addition to the accumulated value.

A no operation (NOP) instruction may be loaded to indicate that no operative task is to be performed.

A photodiode sum (PDS) expression instruction may be loaded to determine a sum of sensor inputs.

A push (PSH) instruction may be loaded to include the shifting of data in the accumulator 184 to the right and/or the pushing of data onto one of the stacks in the stack memory 212. The data may be shifted to the right by a determined value (Accum_shift). The stack may be specified via the stack signal STK. The values RH, RL, the summation output signal 144, the tracking error signal TE, the tracking quadsum signal TQ and other signals may be pushed onto one of the stacks.

A shift accumulator (SHFT Accum) instruction may be loaded to shift data in the accumulator 184 to the right by Accum_shift.

The SOP instruction may be loaded to determine a sum-of-products, such as the SOP $y_k$ of equation 11. A SOP and add (SOPA) instruction may be loaded to add the SOP to an existing accumulated value.

A store (STO) instruction may be loaded to shift an accumulator value right by a shift value, such as Accum_Shift, and store the result in the output registers 134-138, in the data memory 68', or to store the values RH, RL, the summation output signal 144, the tracking error signal TE, the tracking quadsum signal TQ and other signals in the data memory 68'.

A trigger (TRG) instruction may be loaded to clear, invert, or set an output bit or bits in the trigger register 103.

A wait (WAT) instruction may be loaded to pause operation of one or more elements of the servo accelerator 12'. An element may wait for a bit to be specified, cleared, set, or to wait for a division computation to finish, or for some other reason.

Referring to FIG. 4, a sample optical DVD drive system 250 is shown that has a sensor complex with sensors, such as photodiodes, which may provide inputs to the above-described sensor data collection module 120. The system 250 includes a laser source 252, such as a laser diode, that provides a laser beam 254. The laser source 252 may be part of an optical read/write assembly (ORW) 42', sometimes referred to as an optical pick-up assembly. The ORW 42' includes a collimator lens 258, a polarizing beam splitter 260, a quarter wave plate 262, and an objective lens 264. The laser beam 254 is collimated by the collimator lens 258 and passed through the polarizing beam splitter 260. The laser beam 254 is received by the quarter wave plate 262 from the beam splitter 260 and is focused via the objective lens 264. The laser beam 254 may be radially displaced across tracks of the optical medium 268 through movement of the ORW 42' via a sled motor 266. The laser beam 254 is moved while the optical medium 268 is rotated about a spindle axis 269. The laser beam 254 is shaped and focused to form a spot over the land/groove structures of an optical storage medium 268 via lens actuators 270.

The light from the laser beam 254 is reflected off of the optical medium 268 and directed back into the ORW 42'. The reflected light, represented by dashed line 272, is redirected by the beam splitter 260 and focused into a spot over a photo-detector integrated circuit (PDIC) 274 by an astigmatic focus lens 276. The PDIC 274 is a sensor complex and may include any number of photodiodes. Although not shown, additional photo-detectors may be incorporated and used to detect other diffracted light beams not shown.

Figure 5:
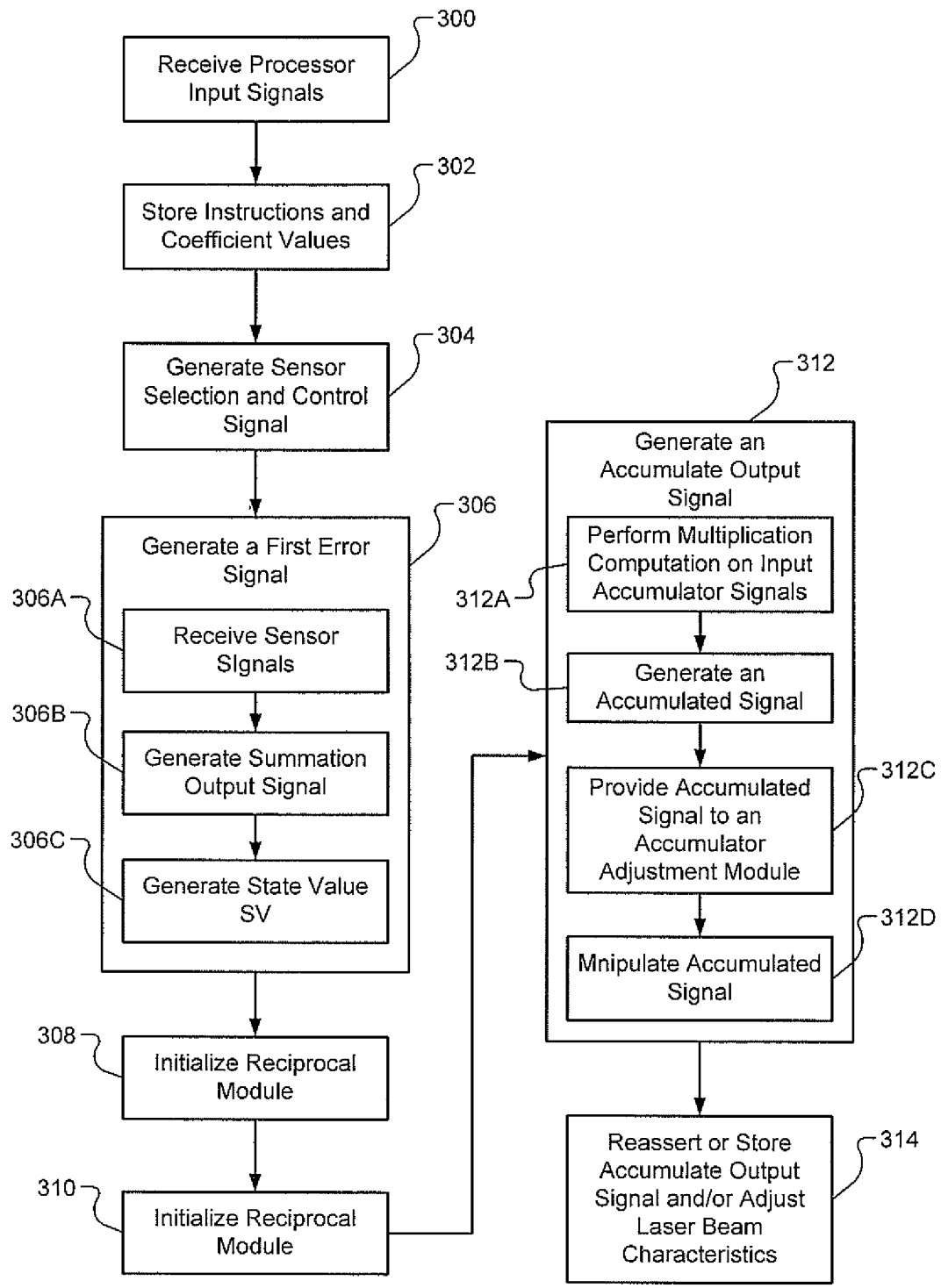
FIG. 5 is a flow diagram illustrating a method of operating an optical drive in accordance with another embodiment of the present disclosure.

Referring to FIG. 5, a flow diagram illustrating a method of operating an optical drive is shown. The operating method includes methods of performing computations within an optical drive and methods of adjusting an optical read/write head. Although the following steps are described primarily with respect to the embodiment of FIG. 3, they may be modified to apply to other embodiments of the present disclosure.

In step 300, the servo accelerator 12' receives input signals from the processor 30' via the I/O terminals 102. The input signals may include instructions and coefficient values for performance of one or more computations and/or for updated adjustment of an optical read/write head. The input signals may also include other information for operation or control of the processor 30', an analog front end module, and/or a DVDA.

In step 302, the instructions and the coefficient values may be stored respectively in the instruction memory 62' and the data memory 68'.

In step 304, the servo accelerator control module 60' may generate the sensor selection and control signal 142 directly or via the instruction memory 142. The sensor selection and control signal 142 is generated based on the received instructions.

In step 306, the error circuit 64' generates a first error signal, which may include the state value SV. The first error signal is generated based on data received from a sensor complex that is indicative of a characteristic of a laser beam on an optical storage medium.

In step 306A, the sensor data collection module 120 receives sensor signals PDA-PDJ. In step 306B, the sensor data collection module 120 generates the summation output signal 144 based on the sensor selection and control signal 142.

In step 306C, the first multiplexer generates the first error signal, which may include the state value SV. The first multiplexer 124 selects between the first set of multiplexer inputs based on a first multiplexer control signal from the servo accelerator control module 60'.

In step 310, the reciprocal module 122 is initialized and the second multiplexer provides the state value SV, the constant C, or data from the data memory 68' to the reciprocal module 122. The servo accelerator control module 60' addresses the data memory 68' to transfer data to the second multiplexer 126. This is performed based on a second multiplexer control signal from the servo accelerator control module 60'.

In step 312, the compensation circuit 66' generates an accumulated output signal 190, which may include a compensation signal and/or a second error signal. The accumulated output signal 190 may be based on the input signals, the sensor signals PDA-PDJ, the summation output signal 144, and the first error signal. Step 312 may be performed during step 310.

In step 312A, the multiply accumulate module 140 receives and may perform a multiplication computation based on an accumulate control signal from the servo accelerator control module 60'. The multiply accumulate module 140 receives and multiplies the first and second accumulator input signals 160, 170 to generate a product signal. As an example, the multiply accumulate module 140 may receive coefficient values, products, or other data from the data memory 68', as included in the first accumulator input signal 160. The multiply accumulate module 140 may receive products or other data from the data memory 68', as included in the second accumulator input signal 170.

In step 312B, the product signal is provided to the adder 182 and summed with the accumulation signal ACCUM. The accumulation signal ACCUM may be stored in the accumulator 184 or elsewhere. Steps 312A and 312B may be repeated to generate the compensation signal value $y_k$.

In step 312C, the accumulator 184 provides the accumulation signal ACCUM to the accumulation adjustment module 186. The accumulator 184 may reset the value of the accumulation signal ACCUM, in the accumulator 184, to zero, a predetermined value, or may maintain a current value.

In step 312D, the accumulation adjustment module 186 may saturate, round, shift, truncate or perform some other manipulation on the received accumulated output signal ACCUM to generate the accumulate output signal 190.

The results of the computations performed by the multiply accumulate module 140 and/or status signals associated with the servo accelerator 12' may be provided to the processor 30' via the software register interface 114.

In step 314, the accumulate output signal 190 may be provided to the output registers 134-138 and/or to one or both of the multiplexers 128, 130. The accumulate output signal 190 may be provided to the multiply accumulate module 140 or stored in the data memory 68'. The accumulate output signal 190 when provided to the output registers 134-138, are stored as servo output signals that are used to adjust characteristics of the laser beam.

The above-described steps are meant to be illustrative examples; the steps may be performed sequentially, synchronously, simultaneously, continuously, during overlapping time periods or in a different order depending upon the application.

The embodiments of the present disclosure provide dedicated hardware that performs computations, which allows a processor to perform other tasks. This hardware minimizes die area consumed on a system-on-chip (SOC). The embodiments provide flexibility in that they provide the ability to modify formulas and computations performed, such as for tracking and focusing error. Filter modification is also provided.

Referring now to FIGS. 6A-6E, various exemplary implementations incorporating the teachings of the present disclosure are shown.

Figure 6B:
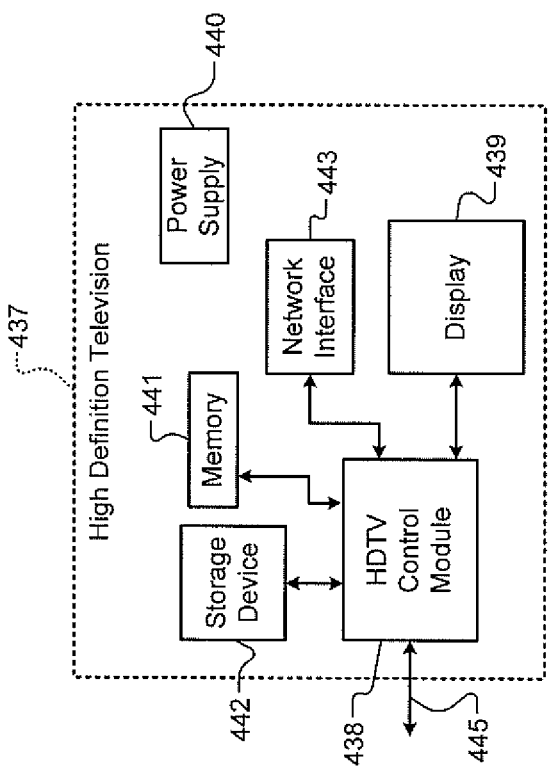
FIG. 6B is a functional block diagram of a vehicle control system.
Figure 6A:
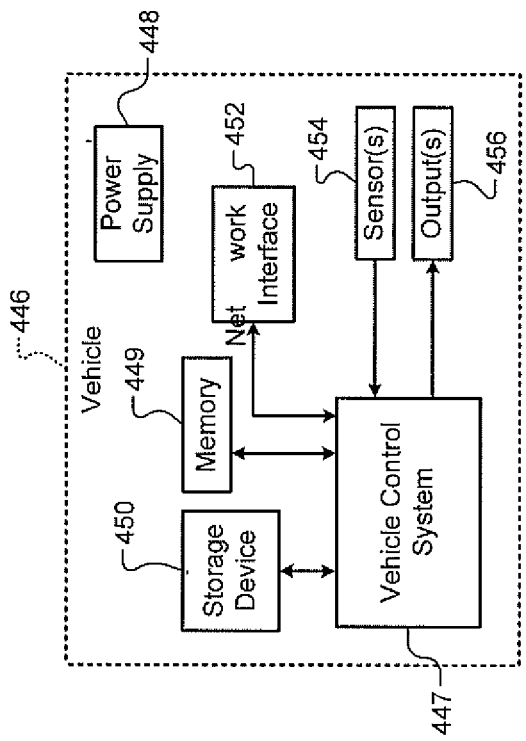
FIG. 6A is a functional block diagram of a high definition television.

Referring now to FIG. 6A, the teachings of the disclosure can be implemented in a storage device 442 of a high definition television (HDTV) 437. The storage device 442 may include an optical storage medium and the above described servo accelerators. The HDTV 437 includes an HDTV control module 438, a display 439, a power supply 440, memory 441, the storage device 442, a network interface 443, and an external interface 445. If the network interface 443 includes a wireless local area network interface, an antenna (not shown) may be included.

The HDTV 437 can receive input signals from the network interface 443 and/or the external interface 445, which can send and receive data via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the network interface 443, and the external interface 445.

Memory 441 may include random access memory (RAM) and/or nonvolatile memory such as flash memory, phase change memory, or multi-state memory, in which each memory cell has more than two states. The storage device 442 may include an optical storage drive, such as a DVD drive, and/or a hard disk drive (HDD). The HDTV control module 438 communicates externally via the network interface 443 and/or the external interface 445. The power supply 440 provides power to the components of the HDTV 437.

Referring now to FIG. 6B, the teachings of the disclosure may be implemented in a storage device 450 of a vehicle 446. The storage device 450 may include an optical storage medium and the above described servo accelerators. The vehicle 446 may include a vehicle control system 447, a power supply 448, memory 449, the storage device 450, and a network interface 452. If the network interface 452 includes a wireless local area network interface, an antenna (not shown) may be included. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the network interface 452.

Figure 6D:
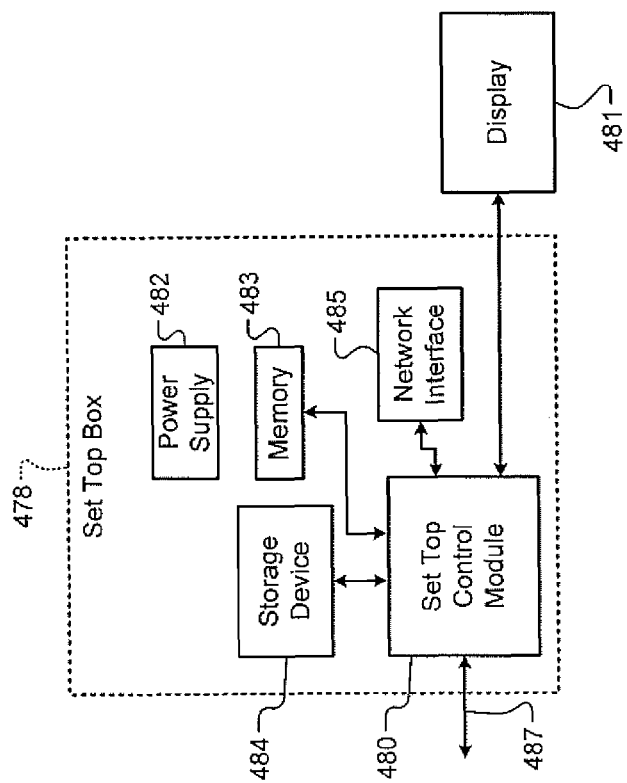
FIG. 6D is a functional block diagram of a set top box.
Figure 6C:
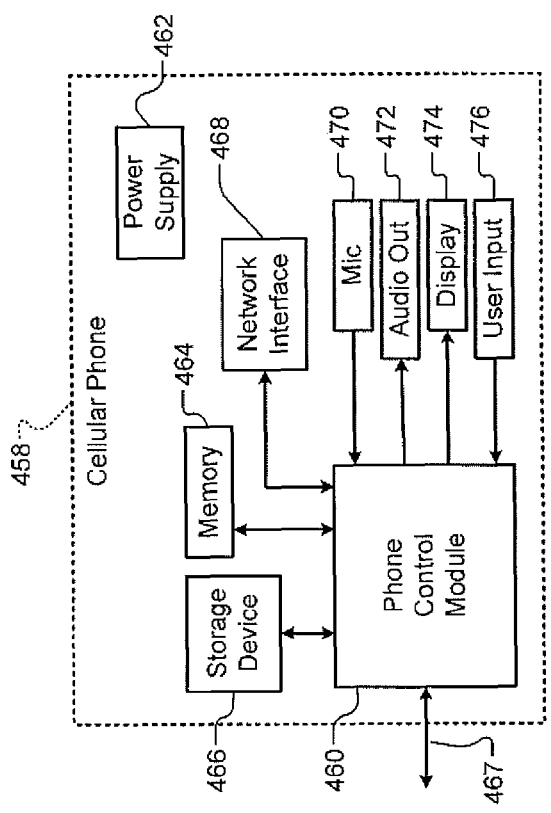
FIG. 6C is a functional block diagram of a cellular phone.

Referring now to FIG. 6C, the teachings of the disclosure can be implemented in a storage device 466 of a cellular phone 458. The storage device 466 may include an optical storage medium and the above described servo accelerators. The cellular phone 458 includes a phone control module 460, a power supply 462, memory 464, the storage device 466, and a cellular network interface 467. The cellular phone 458 may include a network interface 468, a microphone 470, an audio output 472, a display 474, and a user input device 476, such as a keypad and/or pointing device. An example of an audio output is a speaker and/or output jack. If the network interface 468 includes a wireless local area network interface, an antenna (not shown) may be included.

The phone control module 460 may receive input signals from the cellular network interface 467, the network interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the network interface 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 458.

Referring now to FIG. 6D, the teachings of the disclosure can be implemented in a storage device 484 of a set top box 478. The storage device 484 may include an optical storage medium and the above described servo accelerators. The set top box 478 includes a set top control module 480, a display 481, a power supply 482, memory 483, the storage device 484, and a network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or nonvolatile memory such as flash memory, phase change memory, or multi-state memory, in which each memory cell has more than two states. The storage device 484 may include an optical storage drive, such as a DVD drive, and/or a hard disk drive (HDD).

Figure 6E:
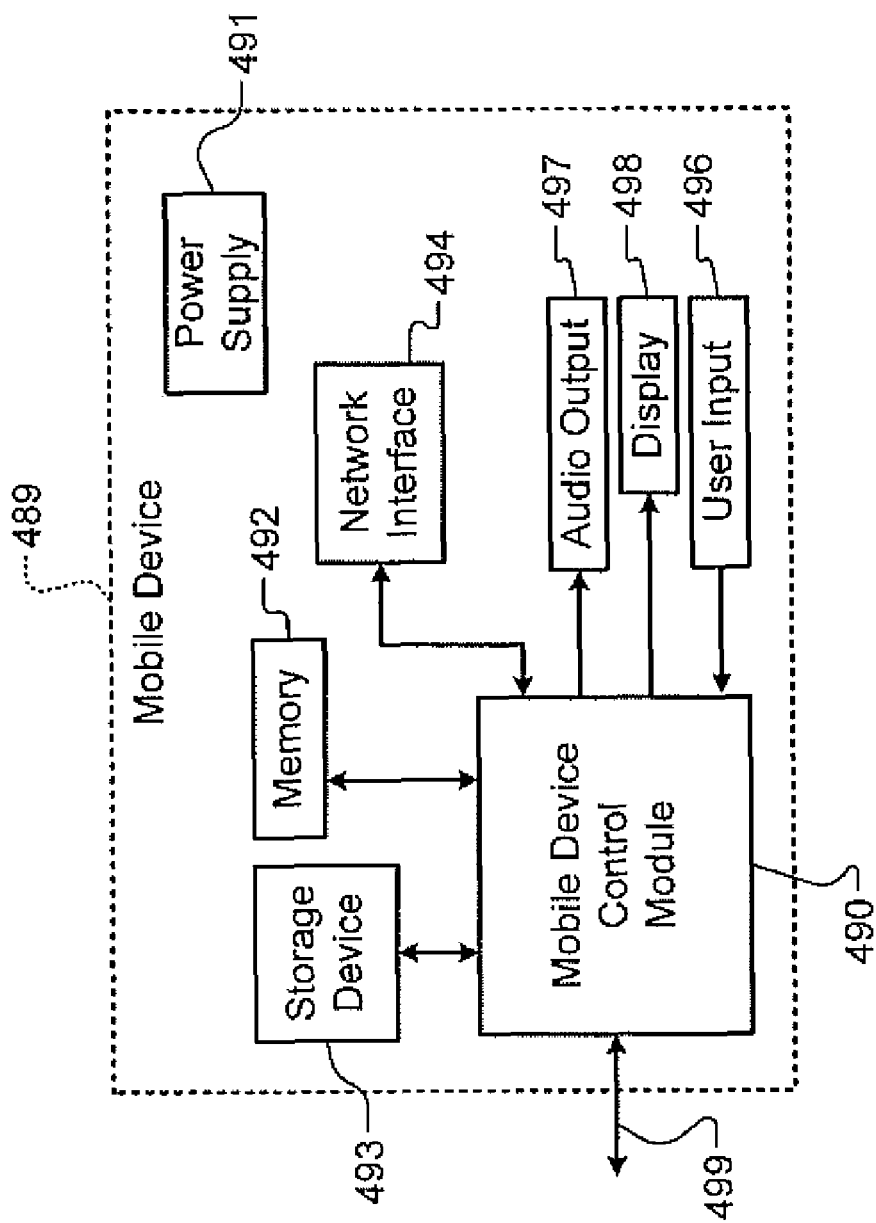
FIG. 6E is a functional block diagram of a mobile device.

Referring now to FIG. 6E, the teachings of the disclosure can be implemented in a storage device 493 of a mobile device 489. The mobile device 489 may include a mobile device control module 490, a power supply 491, memory 492, the storage device 493, a network interface 494, and an external interface 499. If the network interface 494 includes a wireless local area network interface, an antenna (not shown) may be included.

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A channel module comprising:
    a sensor module configured to (i) receive a plurality of sensor signals generated based on at least one detected characteristic of a laser beam of an optical drive, (ii) perform computations based on the plurality of sensor signals, and (iii) generate a computation output signal based on the computations, wherein the at least one detected characteristic includes at least one of focus, position, amplitude, or angle of incidence;
    a control module configured to (i) receive event signals transmitted from a processor to the channel module and (ii) generate a first control signal and a second control signal based on the event signals;
    a first multiplexer configured to receive (i) the computation output signal, (ii) the first control signal, and (iii) a first set of filter values from memory, wherein the first multiplexer is further configured to generate a first input signal based on (i) the computation output signal, (ii) the first control signal, and (iii) the first set of filter values;
    a second multiplexer configured to receive (i) the second control signal, (ii) a second set of filter values from the memory, and (iii) an accumulated output signal, wherein the second multiplexer is configured to generate a second input signal based on (i) the second control signal, (ii) the second set of filter values, and (iii) the accumulated output signal; and
    an accumulate module configured to generate the accumulated output signal based on a sum of products, wherein the sum of products is generated based on the first input signal and the second input signal,
    wherein the at least one detected characteristic of the laser beam is adjusted based on the accumulated output signal.

2. The channel module of claim 1, further comprising the memory configured to store each of the first set of filter values and the second set of filter values.

3. The channel module of claim 1, further comprising input and output (I/O) terminals configured to receive the event signals from the processor, wherein the event signals comprise sensor interrupt bits, fault bits, and instruction bits.

4. The channel module of claim 1, wherein the accumulated output signal comprises at least one of error values and compensation values.

5. The channel module of claim 4, wherein:
    the control module generates a third control signal based on the event signals; and
    the channel module further comprises a third multiplexer configured to store the at least one of the error values and the compensation values in the memory based on the third control signal.

6. The channel module of claim 1, wherein:
    the control module generates a third control signal based on the event signals; and
    the channel module further comprises a third multiplexer configured to generate an error signal based on the third control signal, wherein the error signal comprises the computation output signal, and
    wherein the first multiplexer is configured to generate the first input signal based on the error signal.

7. The channel module of claim 6, wherein:
    the third multiplexer is configured to
        receive a tracking signal from a computation module of the processor, and
        generate the error signal based on the tracking signal; and
    the tracking signal comprises at least one of a quadsum value or a tracking error value, wherein the quadsum value is equal to a sum of four of the plurality of sensor signals.

8. The channel module of claim 6, further comprising a reciprocal module configured to generate a reciprocal signal based on the first input signal, wherein:
    the reciprocal signal is generated based on a reciprocal of a product of values;
    the first input signal comprises the product of values; and
    the third multiplexer is configured to generate the error signal based on the reciprocal signal.

9. The channel module of claim 1, wherein the accumulate module comprises:
    a multiplier configured to multiply the first input signal by the second input signal to generate the products;
    a summer configured to generate the sum of the products;
    an accumulator configured to generate an accumulation signal based on the sum of the products; and
    an adjustment module that adjusts the accumulation signal to generate the accumulated output signal.

10. The channel module of claim 9, wherein the adjustment module is configured to perform at least one of a saturate operation, a round operation, or a shift operation on the accumulation signal to generate the accumulated output signal.

11. An integrated circuit comprising:
    the channel module of claim 1, wherein the channel module further comprises an event register; and
    a processor, wherein the processor comprises
        an interrupt module configured to generate a sensor signal, wherein the sensor signal indicates updated sensor data,
        a fault module configured to generate a fault signal when an error is detected, and
        an interface configured to generate the event signals,
    wherein the event register is configured to store each of the sensor signal, the fault signal, and the event signals.

12. A method of operating a channel module, the method comprising:
    receiving a plurality of sensor signals generated based on at least one detected characteristic of a laser beam of an optical drive, wherein the at least one detected characteristic includes at least one of focus, position, amplitude, or angle of incidence;
    performing computations based on the plurality of sensor signals;
    generating a computation output signal based on the computations;
    receiving event signals transmitted from a processor to the channel module;
    based on the event signals, generating a first control signal and a second control signal;
    generating a first input signal based on (i) the computation output signal, (ii) the first control signal, and (iii) a first set of filter values;
    generating a second input signal based on (i) the second control signal, (ii) a second set of filter values, and (iii) an accumulated output signal;
    generating the accumulated output signal based on a sum of products, wherein the sum of products is generated based on each of the first input signal and the second input signal; and
    adjusting the at least one detected characteristic of the laser beam based on the accumulated output signal.

13. The method of claim 12, wherein the event signals comprise sensor interrupt bits, fault bits, and instruction bits.

14. The method of claim 12, wherein the accumulated output signal comprises at least one of error values and compensation values.

15. The method of claim 14, further comprising:
generating a third control signal based on the event signals; and
storing the at least one of the error values and the compensation values in the memory based on the third control signal.

16. The method of claim 12, further comprising:
generating a third control signal based on the event signals;
generating an error signal based on the third control signal, wherein the error signal comprises the computation output signal; and
generating the first input signal based on the error signal.

17. The method of claim 16, further comprising:
receiving a tracking signal from a computation module of the processor; and
generating the error signal based on the tracking signal, wherein the tracking signal comprises at least one of a quadsum value or a tracking error value, and wherein the quadsum value is equal to a sum of four of the plurality of sensor signals.

18. The method of claim 16, further comprising:
generating a reciprocal signal based on the first input signal, wherein the reciprocal signal is generated based on a reciprocal of a product of values, and wherein the first input signal comprises the product of values; and
generating the error signal based on the reciprocal signal.

19. The method of claim 12, further comprising:
multiplying the first input signal by the second input signal to generate the products;
summing the products to generate the sum of the products;
generating an accumulation signal based on the sum of the products; and
adjusting the accumulation signal to generate the accumulated output signal.

20. The method of claim 19, wherein the adjusting of the accumulation signal comprises performing at least one of a saturate operation, a round operation, or a shift operation on the accumulation signal to generate the accumulated output signal.

* * * * *